United States Patent [19]

Tsuda et al.

[11] Patent Number: 4,917,233

[45] Date of Patent: Apr. 17, 1990

[54] TABLE CONVEYOR

[75] Inventors: Hiroyuki Tsuda; Keiziro Goto; Kiyoshi Egami; Wataru Maida; Toshinobu Honda, all of Kitakyushu, Japan

[73] Assignee: Chikuchi Tekkosho Co. Ltd., Kitakyushu, Japan

[21] Appl. No.: 315,765

[22] Filed: Feb. 27, 1989

[51] Int. Cl.$^4$ ............................................. B65G 23/14
[52] U.S. Cl. ..................................... 198/833; 198/838
[58] Field of Search ................... 198/833, 343, 465.3, 198/803.2, 838

[56] References Cited

U.S. PATENT DOCUMENTS

| | | | |
|---|---|---|---|
| 2,386,558 | 10/1945 | Kleintop | 198/833 X |
| 3,682,295 | 8/1972 | Roinestad | 198/833 |
| 3,767,025 | 10/1973 | Louis | 198/833 X |
| 3,910,406 | 10/1975 | Pulver et al. | 198/833 |
| 4,088,220 | 5/1978 | Jacksch et al. | 198/343 X |
| 4,114,539 | 9/1978 | Deno | 198/833 X |

FOREIGN PATENT DOCUMENTS

| | | | |
|---|---|---|---|
| 2431244 | 12/1975 | Fed. Rep. of Germany | 198/343 |
| 3614559 | 11/1987 | Fed. Rep. of Germany | 198/803.2 |
| 0203016 | 9/1986 | Japan | 198/465.3 |
| 2178713 | 2/1987 | United Kingdom | 198/803.2 |

Primary Examiner—Frank E. Werner
Assistant Examiner—D. Glenn Dayoan
Attorney, Agent, or Firm—Armstrong, Nikaido Marmelstein, Kubovcik & Murray

[57] ABSTRACT

The present invention relates to a table conveyor comprising motor-driven driving chains with which driven chains are interlocked in pairs via friction boards respectively thrusted by springs, wherein the driven chains are connected with parallelly-arranged connecting rods forming a table bed. The total system can be installed into a small area, and an individual table bed can be stopped at any predetermined position.

2 Claims, 4 Drawing Sheets

TABLE CONVEYOR

BACKGROUND OF THE INVENTION

The present invention relates to a table conveyor which is driven by a chain.

Recently, in the assembly line of electrical and other appliances, conveyors are used. Semiproducts are continuously fabricated into products while being transferred by conveyors from process to process. In such a continuous line, a belt conveyor or a roller conveyor with tables thereon has been used. However, for a belt conveyor, there has been a problem in which it is impossible to stop only one semiproduct among many of them, because, in this case, all semiproducts to be fabricated are transferred at the same time on the same belt. For a roller conveyor, there has also been a problem in which it needs another conveyor to return the transferred tables to their original position and, as a result, a large amount of area is needed for the installation thereof. On the other hand, a table conveyor is capable of moving the table thereon by partial use of a chain conveyor. In such a table conveyor, however, there has been a problem in which its monolithic plate-like table needs a special return device, which accordingly make the total system large and expensive.

SUMMARY OF THE INVENTION

The present invention was thought out from the background described above, and the first object of the invention is to provide a relatively inexpensive table conveyor that does not need a large area for installation and is capable of stopping the table thereon at the predetermined position. The second object of the invention is to provide a table conveyor that is capable of stopping an individual table among multiple tables used therein. Accordingly, the present invention is to provide a table conveyor, to attain said first and second objects, comprising a pair of endless driving chains parallelly disposed and engaged respectively with sprokets rotated by a motor. A pair of sectional driven chains is disposed parallelly abutting the driving chains and so arranged as to move through upper and lower guide members. Multiple connecting rods compose table beds by parallelly tying the driven chains. Friction boards are thrust respectively by springs fixed to either the driving chains or the driven chains and transmit the power of the driving chains to the driven chains by friction force.

In the table conveyor according to the present invention described above, when the driving chains are driven by the motor, the power of the driving chains is transmitted to the pair of sectional driven chains via the friction boards thrusted by the springs and therefore the driven chains, disposed parallelly in pairs at both sides, move through the upper and lower members accompanying the movement of the driving chains.

Accordingly, since the pair of driven chains are tied with the multiple parallel rods which form the table beds, the table beds move in company with the driven chains.

As described above, since the power of the driving chains is transmitted to the driven chains by a frictional force, when one of the table beds is stopped, the friction boards, for transmitting the power from the driving chains, slip to make the driven chains stop. However, since the driving chains are running, other table beds following the driving chains keep on moving in company with the movement of the driving chains.

According to the present invention, since the table beds are composed of the connecting rods parallelly fixed to the pair of driven chains, it is possible to arrange the lines of going and returning table beds relatively close in a vertical direction, which accordingly enables a small area for installing the total system. Since each of the table beds is so designed as to individually contact the driving chains via the power-transmitting member of friction boards, it is possible to stop the individual table bed at the predetermined position.

Further, it is possible to build up the table bed to bear a large load by increasing the strength of the connecting rods composing each table bed. It is also possible to form a flat table bed by using connecting rods with a flat top face.

DETAILED DESCRIPTION OF THE EMBODIMENT

Figure 1:
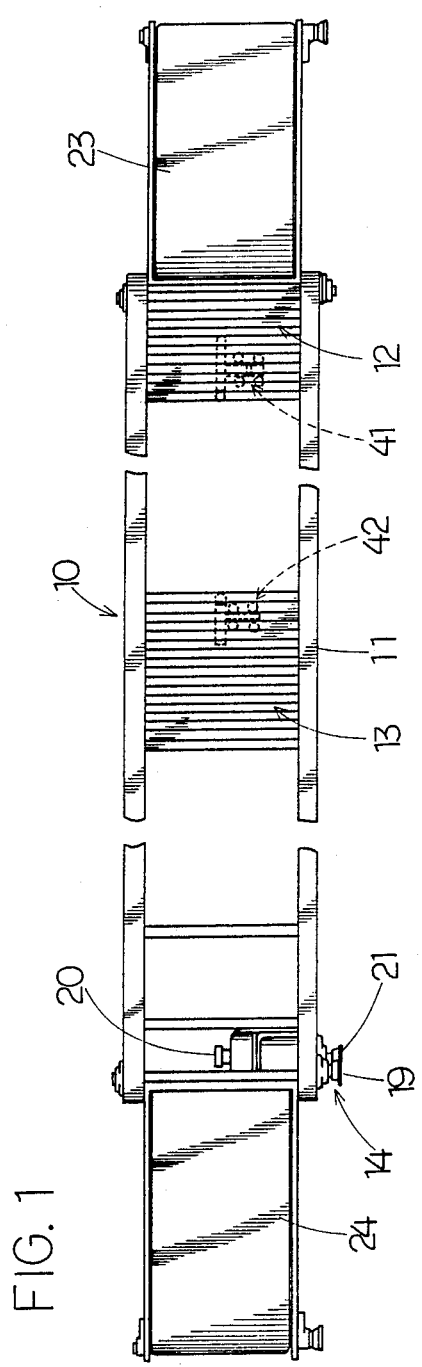
FIG. 1 is a general plan view, with a middle portion omitted, of the table conveyor in one embodiment form according to the present invention.
Figure 2:
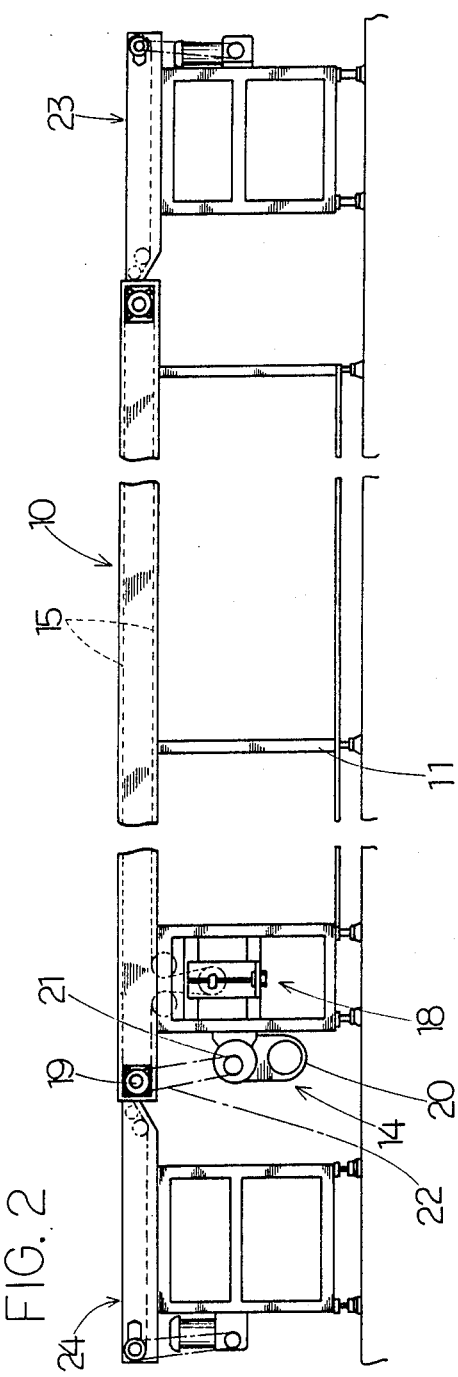
FIG. 2 is a front view, with a middle portion omitted, of the table conveyor.
Figure 3:
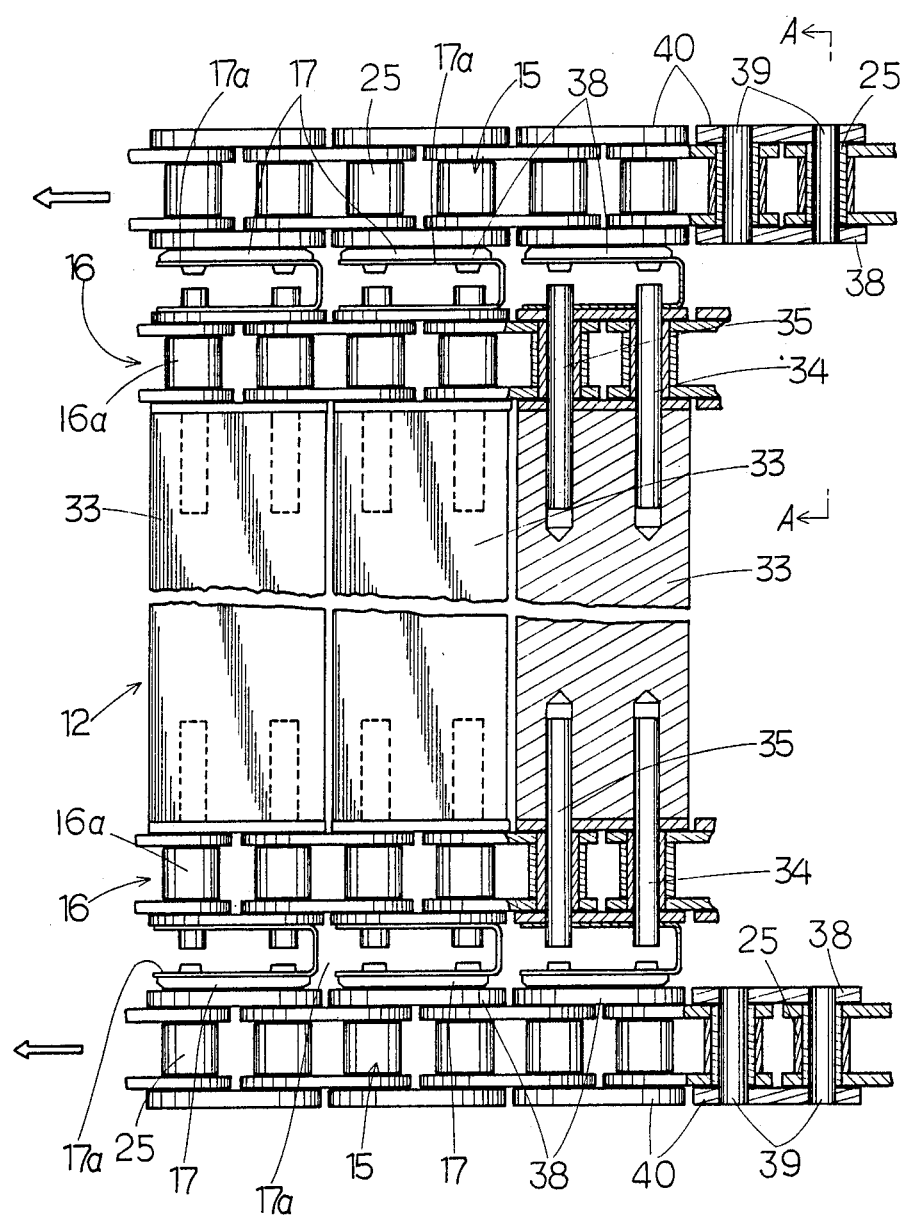
FIG. 3 is a partial plan view, with portions broken away, of the table conveyor.
Figure 4:
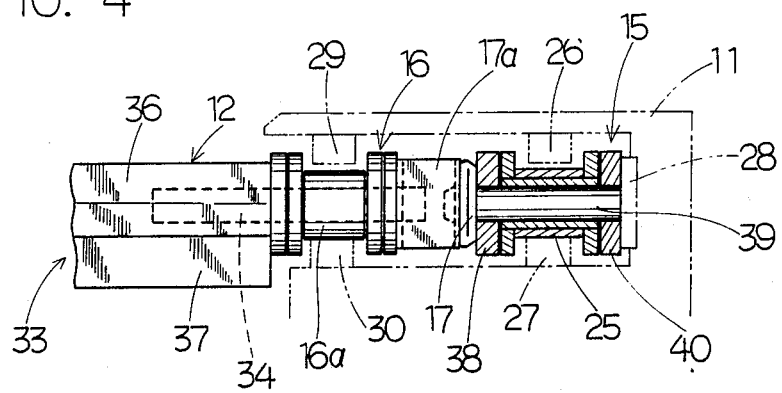
FIG. 4 is a cross-sectional view, along line A—A in FIG. 3.

Referring to FIGS. 1 and 2, a table conveyor 10 in one embodiment form of the present invention comprises a table conveyor frame body 11, table beds 12 and 13, a driving device 14 disposed at the front section, a pair of endless driving chains 15 as shown in FIGS. 3 and 4 disposed at both sides of the frame body 11, a pair of sectional driven chains 16 disposed respectively at both inner sides of the driving chains 15, and thrust springs 17a, in one example form of springs, attached with friction boards 17 which are fixed to the driven chains 16. The components are detailed hereinbelow.

The frame body 11 is totally made of aluminum or steel material and is equipped with the driving chains 15 disposed parallelly at the outer port of both sides thereof, two pairs of sprokets (not shown in figures) engaging respectively the driving chains 15 at both forward and reverse ends, and with tension devices 18 for the driving chains 15 at the front section of the delivery side of the frame body 11. On one shaft end of the sprokets, another sproket 19 is fixed, which is interlocked via a chain 22 with a sproket 21 fixed to the output shaft of a stepless motor 20 having a built-in speed reducer so that the driving chains 15 disposed at both sides may run at the specified speed.

On the other hand, at the charging and discharging sides of the table conveyor 10, conventional belt conveyors 23 and 24 having a belt and a pair of pulleys are disposed respectively so that the loads may transferred from the belt conveyor 23 to the table conveyor 10 and from the table conveyor 10 to the belt conveyor 24.

Here, the detailed relationship between the driving chains 15 and driven chains 16, referring to FIGS. 3 and 4, is as follows.

The driving chains 15, disposed respectively in both sides of the frame body 11, are engaged with the pair of driving sprockets at the forward end at which the chains return, and with the pair of driven sprockets at the reverse end; while, in the middle of chain rollers 25 of the driving chains 15, guide members 26 and 27 are disposed for guiding the chain rollers 25 from top and bottom as shown in FIG. 4 so that the driving chains 15 may run smooth on the specified route.

It is noted that the guide members 26 and 27 may be of either wear-resistant metal or wear-resistant synthetic resin such as polyacetal resin and fixed to the frame body 11 with screws.

On each outside face of the driving chains 15, a stop member 28 made of wear-resistant material such as polyacetal resin is attached as shown in FIG. 4 so that the driving chains 15 may keep specified distance from the frame body without drifting outwards.

Figure 5:
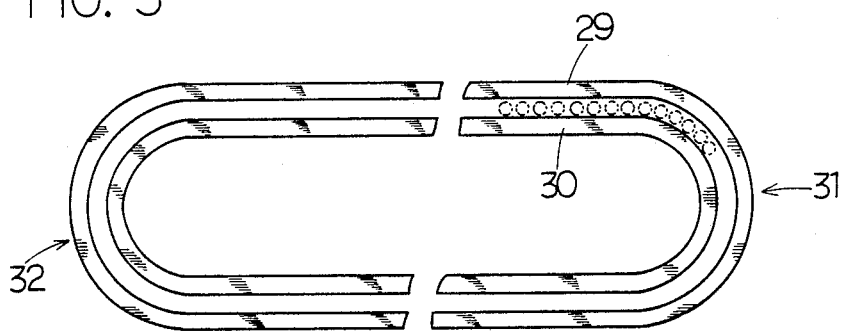
FIG. 5 is a side view, with portions omitted, of guide members for driven chains composing the table conveyor.

At the both inner sides of the driving chains 15, the sectional driven chains 16 are disposed, whose chain rollers 16a are also guided from top and bottom with guide members 29 and 30 made of wear-resistant material as in the case of the above-mentioned driving chains 15. The guide members 29 and 30 have a straight body and semicircular return ends 31 and 32 as shown in FIG. 5 so that the driven chains 16 may run smooth on the specified route.

The driven chains 16 are divided into sections with the length of each table bed, connected with multiple connecting rods 33 which are arranged parallelly and have a flat top face, and accordingly compose the table beds 12 and 13 together with the connecting rods 33.

Figure 6:
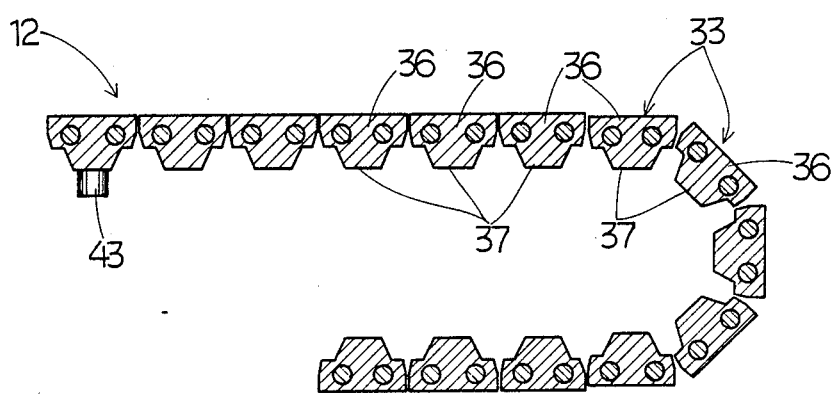
FIG. 6 is a side-sectional view of the table bed composing the table conveyor, showing the rolling state of the table bed.

The connection between the individual connecting rod 33 and the driven chains 16 disposed in pairs at the both ends of the connecting rod 33 is completed by use of the connecting pins 34 and 35 as shown in FIG. 3 and, referring to the cross section thereof as shown in FIG. 6, each of major members 36 of each connecting rod 33 has a flat top face and side faces becoming thinner toward inner end, and an auxiliary member 37 thereof has a trapezoidal shape and integrated into the major member 36, wherein the connecting rod 33, via the link plates, rolls smooth accompanying the rolling driven chains 16.

On the outer sides of the pair of driven chains 16, each one end of U-shaped thrust springs 17a is fixed and, on each opposite end of the thrust springs 17a, a friction board 17 made of wear-resistant synthetic resin such as polyacetal resin is attached. The thrust springs 17a are so designed as to touch the side face of link plates 38 of the driving chains 15 with sufficient thrusting force properly adjusted.

The both ends of connecting pins 39 of the driving chains 15 are machined to be flat so that the ends of the pins 39 may not project out of each surface of the outer link plates 38 and 40 in order to enable accordingly the friction boards 17 to touch and to slide smoothly.

Further, the thrust springs 17a, connected with the connecting pins 34 and 35 which have sufficient length, are integrated into each driven chain 16.

At the specified position of the frame body 11, stop devices 41 and 42 are disposed so as to stop the table beds 12 and 13 at the predetermined position, wherein the stop devices stop the table beds 12 and 13 respectively by catching the column-shaped stoppers 43 attached respectively on the bottom of the table beds 12 and 13.

Figure 7:
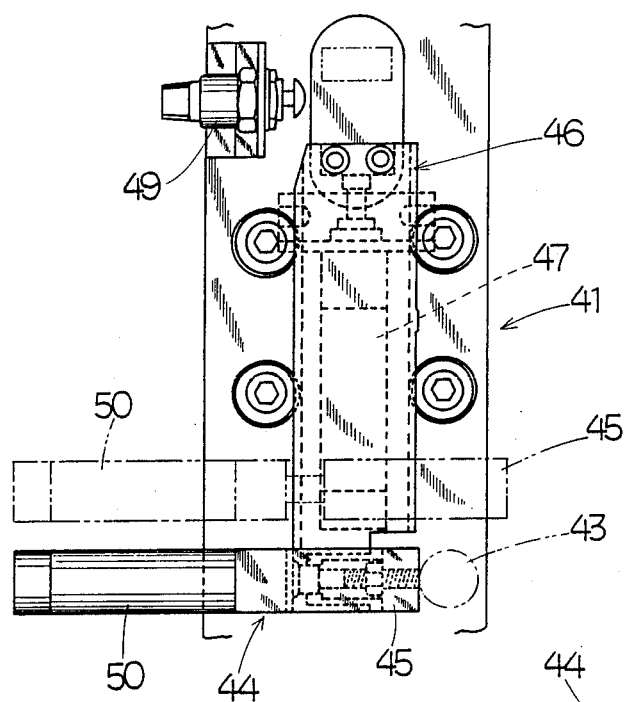
FIG. 7 is a partial plan view of a stop device mounted on the table conveyor.
Figure 8:
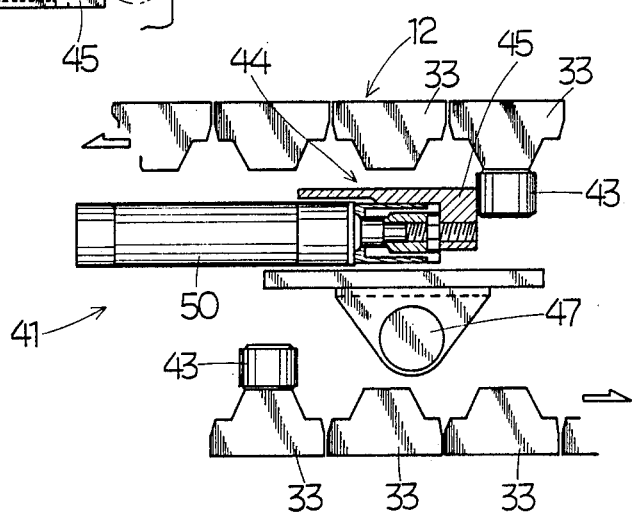
FIG. 8 is a side view of the stop device.

The stop device 41 (same for the stop device 42), as shown in FIGS. 7 and 8, consists of a receive metal 45, attached to a cushion device 44, which catches the stopper 43, and an air cylinder 47, provided with a guide device 46, which shifts the receive metal 45 together with the cushion device 44, wherein, in a normal state, the air cylinder 47 extends to locate the receive metal 45 together with the cushion device 44 to the position shown by the two-dot chainline in FIG. 7 so that the receive metal 45 may not contact the stopper 43.

Figure 9:
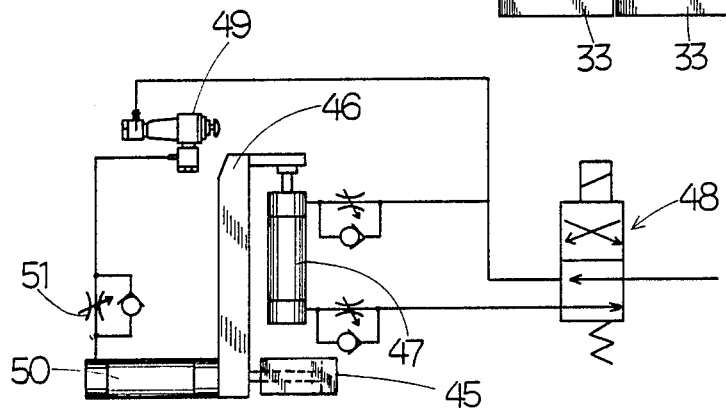
FIG. 9 is an air piping diagram of the stop device.

On the other hand, to stop the table bed 12, an air valve 48 is actuated as shown in FIG. 9 to retract the air cylinder 47 so as to locate the receive metal 45 together with the cushion device 44 to the position at which the stopper 43 is caught. By the above-described action, an air valve 49 actuated by the guide device 46 is opened and accordingly the air in an air cylinder 50 composing the cushion device 44 is released out to the atmosphere through a regulating valve 51, and then the air cylinder 50 for absorbing the shock on the receive metal 45 when it catches the stopper 43 retracts gradually to stop the table bed 12 gradually.

It is noted that the transferring speed of said belt conveyor 23 is set equal to the transferring speed of the table conveyor 10, and, at each forward end of both the belt conveyor 23 and the table conveyor 10, a load detector (not shown in figures) such as a photoelectric element is attached so that the load may be transferred smoothly from the belt conveyor 23 to the table conveyor 10 and from the table conveyor 10 to the belt conveyor 24.

Then, the method of using and the operation of the table conveyor 10 in one embodiment form of the present invention is as follows.

When the pair of driving chains 15 are run by the stepless motor 20, the pair of driven chains 16 are run following the movement of the pair of driving chains 15 because of the friction force applied to the link plates 38 of the driving chains 15 from the friction boards 17 attached to the thrust springs 17a fixed to the driven chains 16. The parallel connecting rods 33 which tie the driven chains 16 disposed at both sides move accompanying the movement of the driven chains 16 and accordingly the table beds 12 and 13 composed with the multiple connecting rods 33 move following the movement of the driving chains 15.

On the other hand, when the stop device 41 or 42 is actuated to make the receive metal 45 catch the stopper 43, the connecting rods 33 are stopped and, as a result, the table bed 12 or 13 is stopped.

During the above-described action, the connecting rods 33 are stopped while the driving chains 15 keep on running, and the driven chains 16 to which the connecting rods 33 are fixed are stopped and accordingly the friction boards 17 attached to the thrust springs 17a slip to become free from the link plates 38 of the driving chains 15, wherein, while holding the above-described state, it is possible to stop the table bed 12 or 13 individually at any predetermined position.

What is claimed is:

1. A table conveyor comprising:
  a frame body;

sprockets;

a driving device disposed on the frame body rotating said sprockets;

a pair of endless driving chains parallelly disposed at both sides of said frame body, said pair of endless driving chains engaging respectively with said sprockets;

guide members disposed within said frame body;

a pair of sectional driven chains parallelly disposed at inner sides of said endless driving chains, said pair of sectional driven chains moving through said guide members;

friction boards operatively attached to said driven chains;

springs connected between said friction boards and said driven chains transmitting power of the driving chains to said driven chains by frictional force; and table beds including a plurality of connecting rods connected parallelly between said pair of sectional driven chains to define a conveying surface.

2. A table conveyor as set forth in claim 1, wherein each of the connecting rods has a flat top face to form a flat table bed.

* * * * *